(12) United States Patent
Tsuna et al.

(10) Patent No.: US 12,534,681 B2
(45) Date of Patent: *Jan. 27, 2026

(54) ROLLING BEARING, PIVOT ASSEMBLY BEARING, AND DISK DRIVE APPARATUS

(71) Applicant: MINEBEA MITSUMI Inc., Nagano (JP)

(72) Inventors: Motojiro Tsuna, Nagano (JP); Takanori Shingai, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/704,114

(22) PCT Filed: Oct. 25, 2022

(86) PCT No.: PCT/JP2022/039760
§ 371 (c)(1),
(2) Date: Apr. 24, 2024

(87) PCT Pub. No.: WO2023/074695
PCT Pub. Date: May 4, 2023

(65) Prior Publication Data
US 2024/0417645 A1  Dec. 19, 2024

(30) Foreign Application Priority Data
Oct. 25, 2021  (WO) .................. PCT/JP2021/039339

(51) Int. Cl.
*C10M 169/00* (2006.01)
*C10M 105/36* (2006.01)
(Continued)

(52) U.S. Cl.
CPC ........ *C10M 169/00* (2013.01); *C10M 105/36* (2013.01); *C10M 115/08* (2013.01);
(Continued)

(58) Field of Classification Search
CPC .......... C10N 2020/071; C10N 2050/10; C10N 2020/069; C10N 2040/18; C10N 2030/06;
(Continued)

(56) References Cited

U.S. PATENT DOCUMENTS 5,707,944 A     1/1998  Yokouchi et al.
10,825,476 B2 * 11/2020 Hanzel ............... G11B 19/2036
(Continued)

FOREIGN PATENT DOCUMENTS

EP   1 529 975 A2   5/2005
JP   10-088158 A    4/1998
(Continued)

OTHER PUBLICATIONS

International Search Report for corresponding International Application No. PCT/JP2022/039760 mailed Jan. 17, 2023.
(Continued)

*Primary Examiner* — Vishal V Vasisth
(74) *Attorney, Agent, or Firm* — Chrisman Gallo Tochtrop LLC (57) ABSTRACT

The application provides a rolling bearing including a grease composition, the grease composition containing a base oil and a thickener, the base oil containing an aromatic ester-based base oil, and the thickener containing a urea-based thickener, where the grease composition has a storage elastic modulus at 25° C. of from 1200 to 3000 Pa as measured under conditions of a film thickness of 1 mm and a shear strain of 1% and has an oil separation amount at 80° C. of from 200 to 270 mm²/mg; a pivot assembly bearing apparatus including the rolling bearing; and a disk drive apparatus including the pivot assembly bearing apparatus.

17 Claims, 5 Drawing Sheets

(51) Int. Cl.
  *C10M 115/08* (2006.01)
  *C10M 133/40* (2006.01)
  *C10M 135/26* (2006.01)
  *C10M 137/04* (2006.01)
  *C10M 141/10* (2006.01)
  *F16C 33/66* (2006.01)
  *C10N 20/00* (2006.01)
  *C10N 20/02* (2006.01)
  *C10N 30/08* (2006.01)
  *C10N 30/10* (2006.01)
  *C10N 40/02* (2006.01)
  *C10N 50/10* (2006.01)

(52) U.S. Cl.
  CPC ........ *C10M 133/40* (2013.01); *C10M 135/26* (2013.01); *C10M 137/04* (2013.01); *C10M 141/10* (2013.01); *F16C 33/6633* (2013.01); C10M 2207/2855 (2013.01); C10M 2215/1026 (2013.01); C10M 2215/30 (2013.01); C10M 2219/087 (2013.01); C10M 2223/041 (2013.01); C10N 2020/02 (2013.01); C10N 2020/071 (2020.05); C10N 2030/08 (2013.01); C10N 2030/10 (2013.01); C10N 2040/02 (2013.01); C10N 2050/10 (2013.01)

(58) Field of Classification Search
  CPC ............ C10N 2040/02; C10N 2020/02; C10N 2030/10; G11B 33/1486; G11B 19/20; G11B 33/1446; G11B 2005/0021; G11B 5/02; F16C 19/06; F16C 35/042; F16C 33/6607; F16C 19/54; F16C 35/12; F16C 33/6633; F16C 2370/12
  See application file for complete search history.

(56) References Cited

U.S. PATENT DOCUMENTS

| | | | |
|---|---|---|---|
| 2003/0153472 A1 | 8/2003 | Nagano et al. | |
| 2003/0158052 A1* | 8/2003 | Akiyama | C10M 169/06 508/438 |
| 2005/0028713 A1 | 2/2005 | McCartney | |
| 2005/0100259 A1 | 5/2005 | Egami et al. | |
| 2005/0152628 A1 | 7/2005 | Egami et al. | |
| 2009/0190873 A1 | 7/2009 | Egami et al. | |
| 2010/0261628 A1 | 10/2010 | Scherer et al. | |
| 2013/0085090 A1 | 4/2013 | Kim et al. | |
| 2013/0096042 A1 | 4/2013 | Oda | |
| 2017/0260472 A1* | 9/2017 | Sagata | C10M 107/38 |
| 2017/0321143 A1* | 11/2017 | Egersdorfer | C10M 133/00 |
| 2018/0291300 A1 | 10/2018 | Tsuna | |
| 2019/0119598 A1 | 4/2019 | Terauchi et al. | |
| 2019/0276763 A1* | 9/2019 | Asai | C10M 169/02 |
| 2020/0109344 A1 | 4/2020 | Hagino et al. | |
| 2020/0181519 A1 | 6/2020 | Takegami et al. | |
| 2020/0248096 A1* | 8/2020 | Maruyama | F16C 33/6633 |
| 2021/0272603 A1 | 9/2021 | Uehara et al. | |

FOREIGN PATENT DOCUMENTS

| | | |
|---|---|---|
| JP | 2001-123191 A | 5/2001 |
| JP | 2004-091764 A | 3/2004 |
| JP | 2005-140261 A | 6/2005 |
| JP | 2005-290256 A | 10/2005 |
| JP | 2006-029347 A | 2/2006 |
| JP | 2006-236410 A | 9/2006 |
| JP | 2007-039496 A | 2/2007 |
| JP | 2008-007741 A | 1/2008 |
| JP | 2008-255272 A | 10/2008 |
| JP | 2010-132746 A | 6/2010 |
| JP | 2013-079357 A | 5/2013 |
| JP | 2013-253257 A | 12/2013 |
| JP | 2014-227474 A | 12/2014 |
| JP | 2016-50954 A | 8/2016 |
| JP | 2017-150615 A | 8/2017 |
| JP | 2017-538840 A | 12/2017 |
| JP | 2018-178085 A | 11/2018 |
| JP | 2019-052200 A | 4/2019 |
| JP | 2019-073666 A | 5/2019 |
| JP | 2020-059776 A | 4/2020 |
| JP | 2021-046557 A | 3/2021 |
| JP | 2021-087279 A | 6/2021 |
| JP | 2021-136049 A | 9/2021 |
| JP | 2021-143310 A | 9/2021 |
| WO | 2016/084781 A1 | 6/2016 |
| WO | 2019/082865 A1 | 9/2020 |

OTHER PUBLICATIONS

Written Opinion for corresponding International Application No. PCT/JP2022/039760 dated Jan. 17, 2023.
English translation of the Written Opinion for corresponding International Application No. PCT/JP2022/039760 mailed Jan. 17, 2023.
International Preliminary Report on Patentability for corresponding International Application No. PCT/JP2022/039760 dated Apr. 30, 2024.
BASF, Leganox L150; 2010.

* cited by examiner

ROLLING BEARING, PIVOT ASSEMBLY BEARING, AND DISK DRIVE APPARATUS

CROSS-REFERENCE TO RELATED APPLICATIONS

This application is a national stage entry of International Application No. PCT/JP2022/039760 filed on Oct. 25, 2022, which claims the benefit of priority to International Application No. PCT/JP2021/039339, filed Oct. 25, 2021, the entire disclosures of which are hereby incorporated herein by reference.

TECHNICAL FIELD

The present invention relates to a rolling bearing filled with a grease composition, and a pivot assembly bearing apparatus including the rolling bearing. The present invention further relates to a disk drive apparatus including the pivot assembly bearing apparatus.

BACKGROUND ART

A magnetic head used for reading and writing data recorded in a disk drive apparatus (HDD) is generally attached to a distal end of a swing arm oscillatably supported by a rolling bearing filled with grease, and a bearing apparatus oscillatably supporting the swing arm is called a pivot assembly bearing apparatus.

For example, as a rolling bearing to be incorporated in a swing arm, there has been proposed a rolling bearing filled with grease obtained by blending, as a thickener, a diurea compound having at least one of an alicyclic hydrocarbon group and an aliphatic hydrocarbon group in a skeleton into a base oil containing an aromatic ester oil having a low outgassing property (Patent Document 1).

CITATION LIST

Patent Literature

Patent Document 1: JP 2006-236410 A

SUMMARY OF INVENTION

Technical Problem

In a rolling bearing to be installed in a pivot assembly bearing apparatus, there is a possibility that grease filled in the bearing may be caught in a rolling groove of the rolling bearing, leading to increased torque and dust generation. In particular, in a disk drive apparatus, there is a possibility that when dust particles from a rolling bearing adhere to a recording disk or a read/write head, that may cause occurrence of read/write errors.

Although studies have been made to suppress read/write errors in HDDs by using an aromatic ester-based base oil with a small amount of outgas (see Patent Document 1), the distance between a magnetic head and a magnetic disk has been reduced to about several nanometers with recent increase in capacity and density of recorded information in HDDs and increase in processing speed, and there is growing concern over issues that can be caused by dust generation and/or volatilization of grease as well as adhesion involved in the dust generation and/or volatilization.

An object of the present invention is to provide a rolling bearing filled with a specific grease composition, and to provide a pivot assembly bearing apparatus with dust generation of the grease composition filled in the bearing being suppressed by incorporating the bearing into a pivot assembly bearing apparatus, thereby making it possible to suppress occurrence of read/write errors in an HDD, and a disk drive apparatus including the pivot assembly bearing apparatus.

Solution to Problem

An aspect of the present invention relates to a rolling bearing, the rolling bearing including: an inner ring; an outer ring disposed coaxially with the inner ring at an outer peripheral side of the inner ring; a plurality of rolling elements disposed between the inner ring and the outer ring; a retainer retaining the rolling elements; and a grease composition retained between the inner ring and the outer ring, the grease composition containing a base oil and a thickener, the thickener containing a urea-based thickener, the urea-based thickener containing a diurea compound represented by Formula (1):

$$R_1\text{—NHCONH—}R_2\text{—HNOCHN—}R_3 \qquad \text{Formula (1)}$$

where in Formula (1), $R_1$ and $R_3$ are monovalent alicyclic hydrocarbon groups or monovalent aliphatic hydrocarbon groups, and a molar ratio of the alicyclic hydrocarbon group to the aliphatic hydrocarbon group is from 6:4 to 8:2, and $R_2$ represents a divalent aromatic hydrocarbon group, wherein the grease composition has:

a storage elastic modulus at 25° C. of from 1200 to 3000 Pa as measured under conditions of a film thickness of 1 mm and a shear strain of 1%, and an oil separation amount at 80° C. of from 200 to 270 mm²/mg.

The present invention also relates to a pivot assembly bearing apparatus including the rolling bearing.

The present invention further relates to a disk drive apparatus including the pivot assembly bearing apparatus.

DESCRIPTION OF EMBODIMENTS

The grease composition to be filled in the rolling bearing according to the present invention (hereinafter also referred to simply as "grease composition") is characterized by being blended with a specific urea-based thickener as described below, and further characterized by being blended with a specific aromatic ester-based base oil. The formulation of this grease composition achieves low dust generation. Further, the grease composition has a characteristic of hardly causing adhesion of a volatile component even when the component is volatilized at a high temperature. If dust particles or a component contained in a volatile component of grease has a property of easily adhering to a recording disk or the like (easily wetting and spreading), when dust generation or volatilization occurs, the component is fixed on a surface of the recording disk and may lead to read/write errors. The grease composition used in the present invention can contribute to suppression of the occurrence of read/write errors in HDDs due to dust generation and volatile components.

Hereinafter, this will be described with details.

[Rolling Bearing]

First, a preferred embodiment of the rolling bearing according to the present invention will be described in detail with reference to the accompanying drawings. Note that the present invention is not limited to the embodiments described below.

Figure 1:
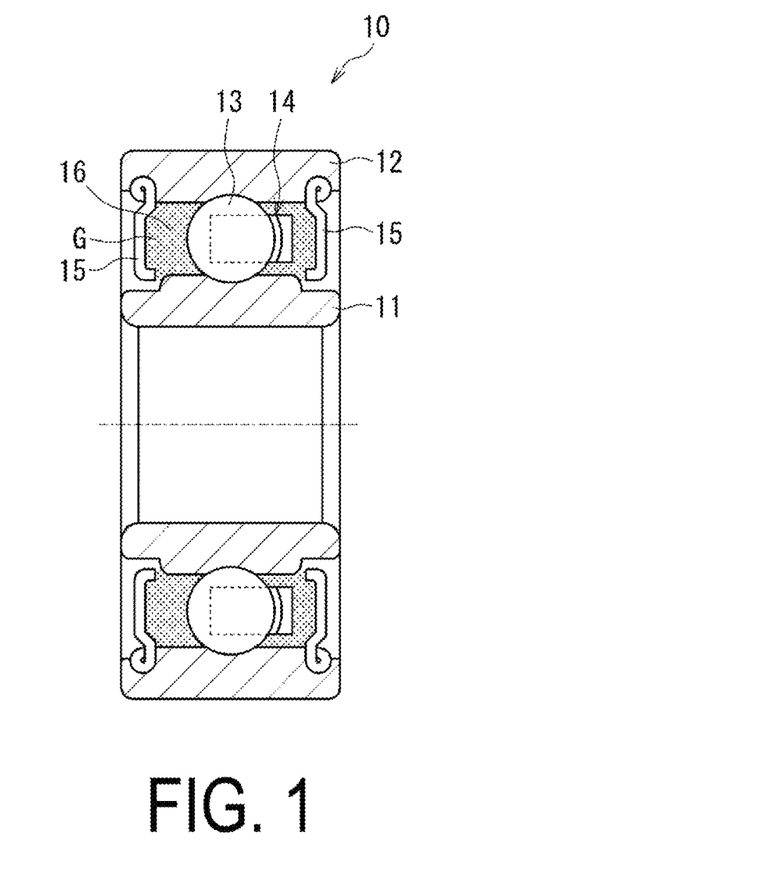
FIG. 1 is a schematic view illustrating an example of a structure of a rolling bearing according to the present invention.

FIG. 1 is a radial cross-sectional view illustrating a rolling bearing 10 according to a preferred embodiment of the present invention. The rolling bearing 10 has a basic structure similar to a known rolling bearing and includes an annular inner ring 11 and an outer ring 12, a plurality of rolling elements 13, a retainer 14, and a sealing member 15.

The inner ring 11 is a cylindrical structure disposed coaxially with a central axis at the outer peripheral side of the shaft (not illustrated). The outer ring 12 is a cylindrical structure disposed coaxially with the inner ring 11 at the outer peripheral side of the inner ring 11. Each of the plurality of rolling elements 13 is a ball disposed in a track at an annular bearing space 16 formed between the inner ring 11 and the outer ring 12. That is, the rolling bearing 10 in the present embodiment is a ball bearing.

Figure 4:
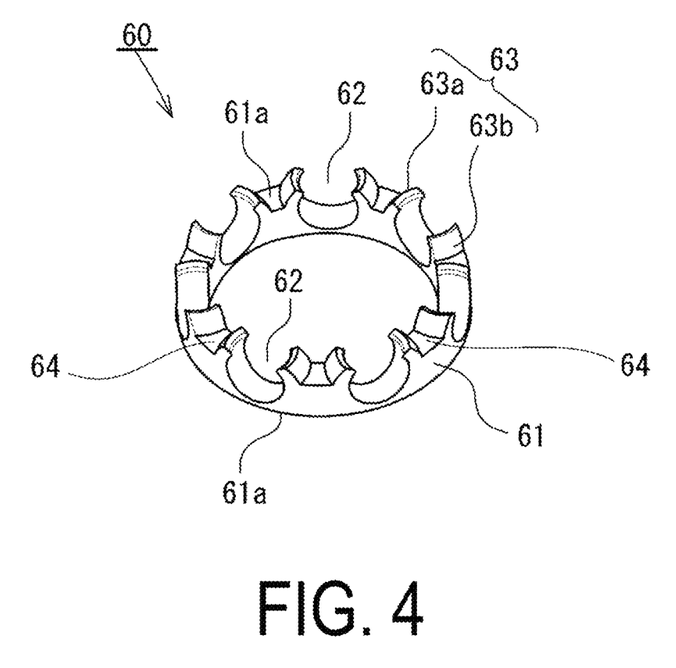
FIG. 4 is a view illustrating a crown-shaped retainer used in a pivot assembly bearing (rolling bearing) of the present invention.

The retainer 14 is disposed in the track to hold the plurality of rolling elements 13. The retainer 14 is an annular body arranged coaxially with the central axis of the shaft and includes a plurality of pockets for holding the rolling elements 13 on one side in the direction of the central axis, and in each of the pockets, the rolling element 13 is located. The rolling elements 13 are retained by the retainer 14 at predetermined intervals in a circumferential direction of the inner ring 11 and the outer ring 12, and falling-off of the rolling elements 13 and contact between the adjacent rolling elements 13 are suppressed. Any shape (crown shape, wave shape, or the like) and material (made of a steel plate, a resin, or the like) of the retainer 14 can be used, but, in the rolling bearing according to the present invention, a retainer (crown shape or the like) having grease pockets is preferred from the viewpoint of suppressing dust generation. An example of a crown-shaped retainer is illustrated in FIG. 4. As illustrated in FIG. 4, the crown-shaped retainer 60 has a cylindrical annular member 61 centered on a central axis (rotation axis) of the rolling bearing 10 (not illustrated). The annular member 61 has an outer peripheral surface, an inner peripheral surface, and two end surfaces 61a connecting the outer peripheral surface and the outer peripheral surface. A plurality of ball pockets (recesses) 62 rotatably accommodating balls (rolling elements 13; not illustrated) are formed at predetermined intervals along the circumferential direction in one end surfaces 61a of the annular member 61. Further, the annular member 60 includes a pair of claws 63 (63a and 63b) extending from the one end surface 61a at both end parts of each ball pocket 62. The pair of claws 63 are curved so as to approach each other, following the curved surface of the ball located in each ball pocket 62, thereby suppressing falling-off of the ball housed in each ball pocket 62. The presence of the claws 63 allows a grease pocket 64 to be formed between the two ball pockets 62. A grease composition G (not illustrated) as described below is contained in the grease pocket 64 and contributes to lubrication between the ball pocket 62 and the ball (rolling element 13) located in the ball pocket.

The sealing member 15 is fixed to the inner circumferential surface of the outer ring 12 and extends toward the inner ring 11 side and seals the bearing space 16. A grease composition G is filled in the bearing space 16 sealed by the sealing member 15. That is, the grease composition G is retained between the inner ring 11 and the outer ring 12. For the grease composition G, a grease composition as described below is used. Note that the amount of the grease composition G filled inside the bearing space 16 is, for example, from 2% to 30% of the volume. In particular, from 3% to 10% is more preferable in a pivot assembly bearing apparatus to be described later that requires low torque. When the amount of the grease composition G filled is within this range, the grease composition G can sufficiently lubricate the rolling elements 13, the inner ring 11, and the outer ring 12 in the bearing space 16 of the rolling bearing 10 to reduce frictional resistance, thereby reducing frictional torque.

The sealing member 15 is formed of, for example, a steel plate or rubber, and its examples include a steel plate shield that is not in contact with an outer periphery of the inner ring 11, or a non-contact type rubber seal that is not in contact with the outer periphery of the inner ring 11. In the present invention, either of the sealing members, the steel plate shield or the non-contact type rubber seal, can be used. From the viewpoint of suppression of outgassing, the steel plate shield is preferably used. Note that the present figure illustrates an aspect in which the sealing member 15 is provided, but the rolling bearing of the present invention also includes an aspect where the rolling bearing includes no sealing member.

In the rolling bearing 10 having the configuration described above, the grease composition G acts to reduce the friction between the rolling elements 13 and the retainer 14, and the friction between the rolling elements 13 and the inner ring 11 and the outer ring 12. By reducing the friction, the frictional torque is reduced, and the generation of frictional heat is also suppressed, promoting smooth rotation of the inner ring 11 and the outer ring 12. As can be seen from the configuration presented in FIG. 1, the grease composition G filled in the rolling bearing 10 lubricates between the rolling elements 13 and the inner ring 11 or the outer ring 12 when the rolling bearing 10 rotates.

The rolling bearing 10 of the present embodiment can be used as a rolling bearing to be provided in a pivot assembly bearing apparatus. The rolling bearing 10 of the present embodiment is advantageous, in that dust is less likely to be generated during driving by using a specific grease composition as described below, and thus the occurrence of read/write errors of a magnetic disk caused by adhesion of the dust generated can be suppressed.

The rolling bearing 10 of the present embodiment is suitably used in a pivot assembly bearing apparatus, but the use of the rolling bearing is not limited to this. For example, the rolling bearing can be used as a rolling bearing for a small motor (e.g., a brushless motor, a stepping motor, or a fan motor) used in automobiles, home appliances, information devices, and the like.

[Pivot Assembly Bearing Apparatus and Disk Drive Apparatus]

Hereinafter, a pivot assembly bearing apparatus including the rolling bearing of the above-described embodiment and a disk drive apparatus including the pivot assembly bearing apparatus will be described with reference to the accompanying drawings. Note that the present invention is not limited to the embodiments described below.

Figure 2:
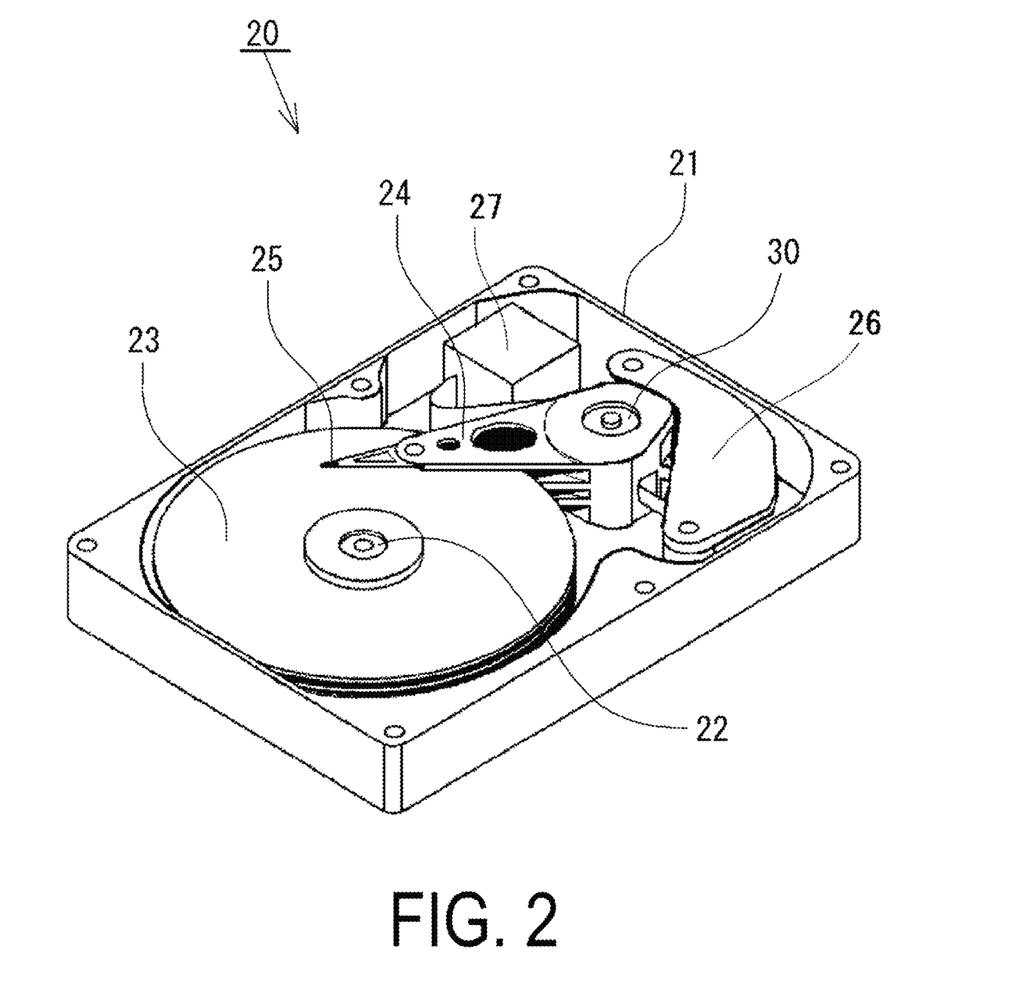
FIG. 2 is a schematic view illustrating an example of a structure of a disk drive apparatus according to the present invention.

FIG. 2 is a perspective view illustrating an overall configuration of a disk drive apparatus 20 of a preferred embodiment of the present invention.

As illustrated in FIG. 2, the disk drive apparatus 20 according to the present embodiment includes a base (base plate) 21 having a substantially rectangular box shape, a spindle motor 22 placed on the base 21, a magnetic disk 23 rotated by the spindle motor 22, a swing arm 24 having a magnetic head 25 writing information at a predetermined position of the magnetic disk 23 and reading information from any position, a pivot assembly bearing apparatus 30 oscillatably supporting the swing arm 24, an actuator 26 driving the swing arm 24, and a controller 27 controlling the components.

The disk drive apparatus of the present invention can be a disk drive apparatus including 9 or more magnetic disks having a diameter of 3.5 inches, for example. In such an apparatus having a large number of disks, a spatial volume in the apparatus is further reduced. The disk drive apparatus may have an internal space filled with a gas that has a density lower than air. In such a disk drive apparatus having an internal space filled with such a low-density gas, the air pressure inside the apparatus may be less than 1 atmosphere. The disk drive apparatus can employ a heat-assisted magnetic recording (HAMR) system as a recording system. In the disk drive apparatus employing the heat-assisted magnetic recording (HAMR) system, the temperature of a head portion of an actuator may locally reach a high temperature of 400° C.

Figure 3:
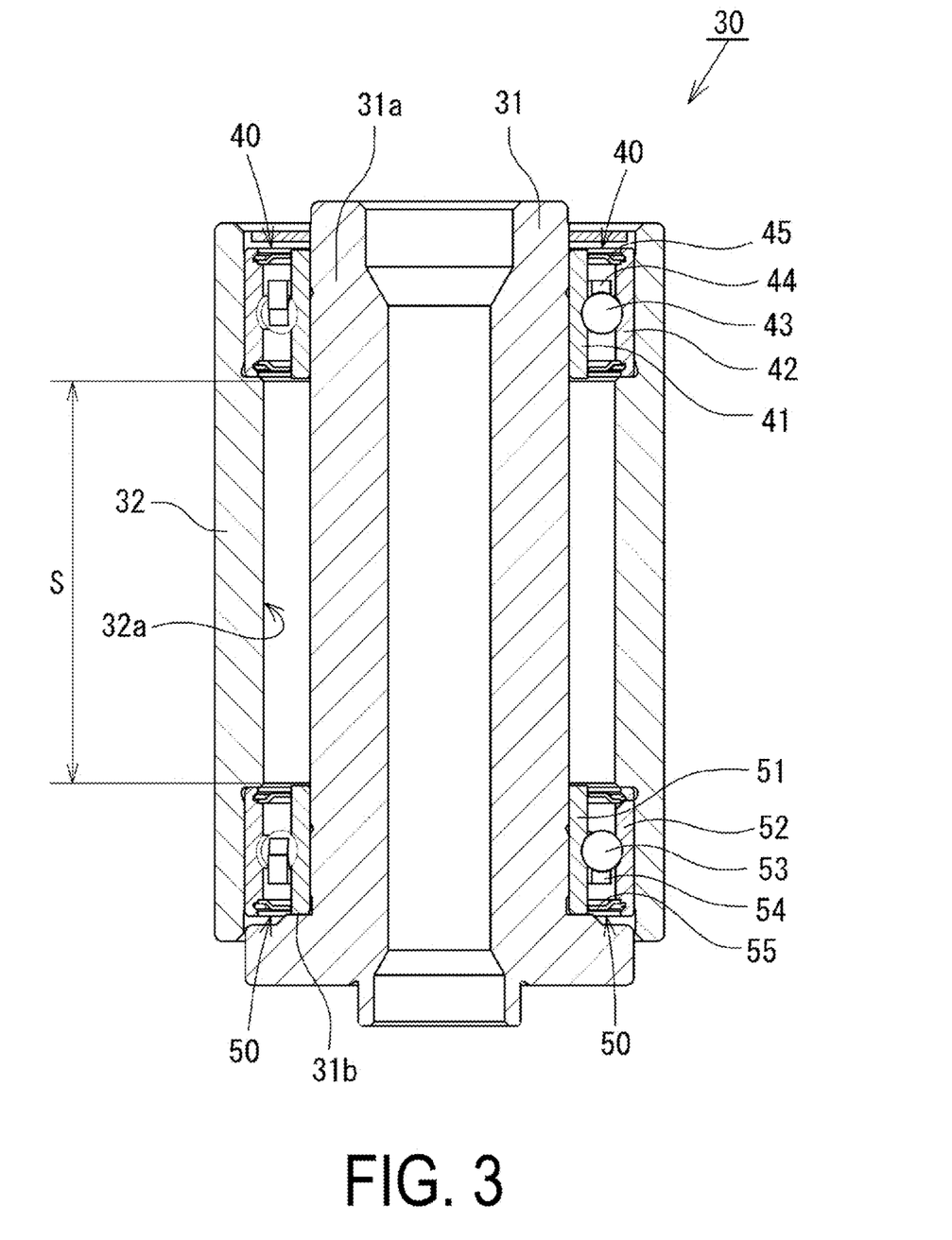
FIG. 3 is a schematic view illustrating an example of a structure of a pivot assembly bearing apparatus according to the present invention.

FIG. 3 is a cross-sectional view of the pivot assembly bearing apparatus 30 of a preferred embodiment of the present invention.

The pivot assembly bearing apparatus 30 of the present embodiment is mainly constituted by a shaft (axis) 31, a first bearing 40 and a second bearing 50 as two rolling bearings fitted to the shaft 31 with a space S of a predetermined length, and a sleeve 32 (outer peripheral member) externally covering the two rolling bearings 40 and 50. The sleeve 32 has a spacer portion 32a provided for disposing the two rolling bearings 40 and 50 with the space S of a predetermined length in the axial direction.

As such, the shaft 31 is rotatably retained by the first bearing 40 and the second bearing 50.

The spacer portion 32a is not limited to the spacer portion integrally formed with the sleeve 32 as in the embodiment illustrated in FIG. 3, and the sleeve and the spacer may be formed as separate components.

The rolling bearing 10 according to the embodiment of the present invention described above is used as the first bearing 40 and the second bearing 50.

The first bearing 40 is mainly constituted by a first inner ring 41; a first outer ring 42; balls 43 which are a plurality of rolling elements disposed in a track formed between the first inner ring 41 and the first outer ring 42; a retainer 44 disposed in the track to retain the balls 43; a sealing member 45 shielding the track from the outside; and a grease composition (not illustrated) to be used in the present invention and filled in the track.

Similarly, the second bearing 50 is mainly constituted by a second inner ring 51; a second outer ring 52; balls 53 which are a plurality of rolling elements disposed in a track formed between the second inner ring 51 and the second outer ring 52; a retainer 54 disposed in the track to retain the balls 53; a sealing member 55 shielding the track from the outside; and a grease composition (not illustrated) to be used in the present invention and filled in the track.

The shaft 31 has a tubular shaft body 31a and a flange portion 31b formed at one end side of the shaft body 31a and is attached to the base 21 (see FIG. 2) of the disk drive apparatus 20 with the flange portion 31b positioned at a side of the base 21. One end part of the second inner ring 51 of the second roller bearing is in contact with the flange portion 31b of the shaft.

In the pivot assembly bearing apparatus 30 of the present embodiment, the first and second bearings 40 and 50 as the rolling bearings filled with a grease composition as described below are used.

Although a general rolling bearing continuously rotates in one direction, the pivot assembly bearing apparatus 30 performs an oscillating motion at a high speed such that normal rotation and reverse rotation are repeated at a minute angle in order to move the magnetic head 25 of the disk drive apparatus 20 over the magnetic disk 23. It is necessary to move the magnetic head 25 to an accurate position at a high response speed.

The grease composition used in the present embodiment can achieve an oil separation amount in an appropriate range and exhibits excellent shape stability of grease. Therefore, it is possible to suppress insufficient supply of a lubricant and oil leakage. As a result, the disk drive apparatus 20 of the present embodiment can stably drive the rolling bearings (the first and second bearings 40 and 50) for a long time. This leads to suppression of read/write errors of the disk drive apparatus and enables the extension of the life of the pivot assembly bearing apparatus as well as the disk drive apparatus.

In addition, in the grease composition used in the present embodiment, even when the base oil volatilizes at a high temperature, the volatilized base oil less adheres to the magnetic disk or the like, and read/write errors of the disk drive apparatus can be suppressed.

[Grease Composition]

The present inventors have focused on the shape of the grease that has been filled in the rolling bearing from the viewpoint of dust generation that seems to occur when the grease that has been filled in the bearing is caught in a rolling groove of the rolling bearing. For maintaining the shape of the grease, a specific urea-based thickener has been adopted as a configuration to suppress movement of the grease body to the rolling groove and suppress dust generation of the grease which may occur from the rolling groove.

Further, the present inventors have conducted studies on constituent components based on a new idea that, even when dust is generated or the constituent components of the grease are volatilized, these components are less likely to adhere to the disk or the like (meaning not staying even if they adhere). Furthermore, the present inventors have found that, when an aromatic ester compound having an alkyl chain length that is a certain length or more is adopted as the base oil, a grease composition achieving the above-described idea can be obtained.

Next, a grease composition to be filled in the rolling bearing of the present invention will be described.

<Base Oil>

The grease composition to be filled in the rolling bearing according to the present embodiment uses an aromatic ester-based base oil.

The aromatic ester-based base oil to be used in the present invention is characterized by being an aromatic ester compound, the aromatic ester compound having an ester group as a substituent on a ring and having an alkyl group with a total of 8 or more carbon atoms bonded to an oxygen atom of the ester group.

The use of the aromatic ester compound having the above structure as the base oil can provide a grease composition having such a characteristic that, even when the base oil is exposed to a high temperature and evaporates, the evaporated base oil hardly adheres to a surface of the magnetic disk or the like.

The aromatic ester compound is a compound having an alkyl group with a total of 8 or more carbon atoms bonded to an aromatic ring via an ester group *—(CO)O—, where * is a bonding site to the aromatic ring. In other words, it is a compound having a hydrogen atom on the aromatic ring substituted with an alkyl ester group with 8 or more carbon atoms (the number of carbon atoms here refers to the number of carbon atoms in the alkyl group moiety).

Examples of the aromatic ring include a benzene ring and a naphthalene ring, and, among them, a benzene ring can be exemplified.

The number of substitutions with alkyl ester groups on the aromatic ring is not particularly limited. For example, a compound substituted with about from one to three alkyl ester groups can be exemplified. When the aromatic ester compound is a compound substituted with two or more alkyl ester groups, the alkyl ester groups may be the same or different. When the aromatic ester compound is a compound substituted with two or more alkyl ester groups, it is preferred that at least one is an alkyl ester group with 8 or more carbon atoms and that all the alkyl ester groups are alkyl ester groups with 8 or more carbon atoms (the number of carbon atoms here refers to the number of carbon atoms in the alkyl group moiety) (the same applies to examples of linear and branched alkyl groups as described below; when the aromatic ester compound has two or more alkyl ester groups, the alkyl group in at least one alkyl ester group has the exemplified group, and preferably the alkyl groups in all the alkyl ester groups have the exemplified group).

The alkyl group with a total of 8 or more carbon atoms may be linear or branched. The branched alkyl group may have a plurality of branched chains, and branching sites are not particularly limited.

The linear alkyl group with a total of 8 or more carbon atoms in the aromatic ester compound is, for example, a linear alkyl group with 8 or more and 11 or less carbon atoms, or can be a linear alkyl group with 9 or more and 11 or less carbon atoms.

The branched alkyl group with a total of 8 or more carbon atoms can have a total of 9 or more and 16 or less carbon atoms, for example, a total of 11 or more and 16 or less carbon atoms.

The branched alkyl group with a total of 8 or more carbon atoms can be, for example, a branched alkyl group formed with a branched chain bonded to a linear alkyl group with 8 or more and 11 or less carbon atoms. The branched alkyl group is an alkyl group with 8 or more and 11 or less carbon atoms in a carbon chain serving as the longest chain, when counted from the carbon atom bonded to the oxygen atom of the ester group. The branched alkyl group may be, for example, a branched alkyl group formed with a plurality of branched chains bonded to a linear alkyl group with 6 or more and 11 or less carbon atoms as long as the total number of carbon atoms is 8 or more.

In the aromatic ester compound, an aspect in which the alkyl group with a total of 8 or more carbon atoms is a linear alkyl group having the specific total number of carbon atoms or an aspect in which the alkyl group with a total of 8 or more carbon atoms is a branched alkyl group having the specific total number of carbon atoms means that the aromatic ester compound essentially contains the linear alkyl group or branched alkyl group described above as the alkyl group bonded to the oxygen atom of the ester group *—(CO)O—.

That is, for example, when the aromatic ester compound is substituted with two or more alkyl ester groups, the alkyl group of at least one of the alkyl ester groups may be the above-described specific linear alkyl group or specific branched alkyl group; the alkyl group of the remaining alkyl ester group may be another alkyl group; and it is not intended to particularly exclude the use of other aromatic ester compounds having an alkyl group with a total of 8 or more carbon atoms as the base oil.

In short, in the above aromatic ester compound, for example, an aspect that reads "the branched alkyl group with a total of 8 or more carbon atoms is a branched alkyl group with a total of 9 or more and 16 or less carbon atoms" can include any of the following aspects including: in the ester-based base oil, an aspect consisting only of an aromatic ester compound containing only the branched alkyl group as the alkyl group bonded to the oxygen atom of the ester group; an aspect consisting only of an aromatic ester compound containing the branched alkyl group and another alkyl group (for example, a linear alkyl group with a total of 8 or more and 11 or less carbon atoms) as the alkyl group bonded to the oxygen atom of the ester group; and an aspect including either or both of the aromatic ester compounds and an aromatic ester compound containing an alkyl group other than the branched alkyl group (for example, an aromatic ester compound containing a linear alkyl group with a total of 8 or more and 11 or less carbon atoms) as the alkyl group bonded to the oxygen atom of the ester group.

In an embodiment of the present invention, the base oil is selected from aromatic ester compounds having a branched alkyl group with a total of 9 or more and 16 or less carbon atoms bonded at least to the oxygen atom of the ester group. That is, in this embodiment, when the aromatic ester compound has two or more ester groups, at least one of the alkyl groups bonded to the oxygen atoms of the ester groups may be a branched alkyl group with a total of 9 or more and 16 or less carbon atoms, and the remaining alkyl groups are not limited to the branched alkyl groups with a total of 9 or more and 16 or less carbon atoms. In another embodiment, the branched alkyl group with a total of 9 or more and 16 or less carbon atoms may be a branched alkyl group with a total of 11 or more and 16 or less carbon atoms. Also in this embodiment, when the aromatic ester compound has two or more ester groups, at least one of the alkyl groups bonded to the oxygen atom of the ester group may be a branched alkyl group with a total of 11 or more and 16 or less carbon atoms, and the remaining alkyl groups are not limited to the branched alkyl groups with a total of 11 or more and 16 or less carbon atoms.

Examples of the aromatic ester compound can include a triester of trimellitic acid (1,2,4-benzenetricarboxylic acid).

Preferable examples of the aromatic ester compound can include a triester compound of trimellitic acid represented by the following formula:

[Chem. 1]

In the formula, R is each independently a linear or branched alkyl group with a total of 8 or more carbon atoms, for example, a linear alkyl group with 8 or more and 11 or less carbon atoms, a branched alkyl group formed with a branched chain bonded to a linear alkyl group with 8 or more and 11 or less carbon atoms, or a branched alkyl group formed with two or more branched chains bonded to a linear alkyl group with 6 or more and 11 or less carbon atoms. The total number of carbon atoms of the branched alkyl group can be, for example, 9 or more and 16 or less.

For the aromatic ester-based base oil to be used in the present invention, an aromatic ester compound having a kinematic viscosity at 40° C. in a range of, for example, from 40 to 130 mm²/s, particularly in a range of from 50 to 80 mm²/s can be used.

The aromatic ester-based base oil having a kinematic viscosity within the predetermined range is not particularly limited, and examples of the aromatic ester-based base oil can include an aromatic ester compound having an ester group as a substituent on the above-described ring and having an alkyl group with a total of 8 or more carbon atoms bonded to an oxygen atom of the ester group.

The base oil may be contained in a proportion of, for example, 80 mass % or more based on a total mass of the grease composition to be used in the present invention. For example, the base oil is contained in a proportion of from 80 mass % to 98 mass % based on the total mass of the grease composition.

<Thickener>

A urea compound has excellent heat resistance, water resistance, and particularly excellent stability at high temperatures, and thus is suitably used as a thickener at an application site in high-temperature environments.

The grease composition used in the present invention uses a urea compound, specifically an alicyclic aliphatic diurea compound, as the thickener.

The alicyclic aliphatic diurea compound can be, for example, a diurea compound represented by Formula (1):

where $R_1$ and $R_3$ are monovalent alicyclic hydrocarbon groups or monovalent aliphatic hydrocarbon groups, and a molar ratio of the alicyclic hydrocarbon group to the aliphatic hydrocarbon group is from 6:4 to 8:2, and $R_2$ represents a divalent aromatic hydrocarbon group.

$R_1$ and $R_3$ may be the same, that is, both may be monovalent alicyclic hydrocarbon groups or monovalent aliphatic hydrocarbon groups, or one may be a monovalent alicyclic hydrocarbon group and the other may be a monovalent aliphatic hydrocarbon group.

In the present invention, in the diurea compound represented by Formula (1), the diurea compound is characterized by having the molar ratio of the alicyclic hydrocarbon group to the aliphatic hydrocarbon group being in a range of from 6:4 to 8:2. When the molar ratio of the alicyclic hydrocarbon group to the aliphatic hydrocarbon group falls within the above range, the storage elastic modulus and oil separation amount of the grease composition containing the diurea compound can fall within predetermined ranges.

By employing a diurea compound in consideration of the storage elastic modulus and oil separation amount of the grease composition as described below, when the grease composition is filled in a rolling bearing and the rolling bearing is driven, the shape of the filled grease composition is maintained and an appropriate amount of the oil content (base oil) is supplied to rolling elements. Therefore, a grease composition having appropriate lubricating performance and suppressed dust generation can be obtained.

Examples of the monovalent alicyclic hydrocarbon group include an alicyclic hydrocarbon group with from 5 to 12 carbon atoms.

Examples of the monovalent aliphatic hydrocarbon group include linear or branched saturated or unsaturated aliphatic hydrocarbon groups with from 6 to 26 carbon atoms.

Examples of the divalent aromatic hydrocarbon group include divalent aromatic hydrocarbon groups with from 6 to 20 carbon atoms.

The alicyclic aliphatic diurea compound to be used in the present invention can be synthesized using an amine compound and an isocyanate compound. For example, the diurea compound is obtained by using an alicyclic amine and an aliphatic amine as amine raw materials and synthesizing the amines with an aromatic diisocyanate. The alicyclic amine and aliphatic amine as the amine raw materials are charged in amounts of alicyclic amine: aliphatic amine=from 6:4 to 8:2, for example, and reacted with the aromatic diisocyanate, thereby making it possible to obtain a compound having a molar ratio of the alicyclic hydrocarbon group to the aliphatic hydrocarbon group, in the total amount of the diurea compound, of from 6:4 to 8:2.

Examples of the amine compound include: aliphatic amines represented by hexylamine, octylamine, dodecylamine, hexadecylamine, octadecylamine (stearylamine), behenylamine, oleylamine and the like; and alicyclic amines represented by cyclohexylamine and the like.

Examples of the isocyanate compound used include aromatic diisocyanates such as phenylene diisocyanate, tolylene diisocyanate (TDI), diphenyldiisocyanate, diphenylmethane diisocyanate (MDI), and dimethylbiphenyl diisocyanate (TODI).

The thickener is contained in a proportion of, for example, from 10 mass % to 15 mass % based on the total mass of the grease composition used in the present invention. When the thickener is used in a proportion of more than 15 mass %, the grease composition may have an excessively small oil separation amount, resulting in a concern about poor lubrication. On the other hand, when the thickener is used in a proportion of less than 10 mass %, the oil separation amount may become too large, resulting in not only a concern about contamination of the apparatus, but also a concern that the grease flows out from the grease pocket of the retainer and is caught between the rolling element and a track ring of the bearing to increase a rotational torque.

In particular, from the viewpoint of obtaining a grease composition having an appropriate oil separation amount and particularly excellent flow characteristics and life characteristics, the thickener is preferably contained in a proportion of, for example, from 10 mass % to 13 mass %.

<Additional Additive>

Furthermore, in addition to the essential components described above, the grease composition can contain an additive normally used in grease compositions as necessary within a range not impairing the effects of the present invention.

Examples of such an additive include antioxidants, rust inhibitors, extreme pressure additives (extreme pressure agents), metal deactivators, anti-friction agents (wear resistant agents), oiliness improvers, viscosity index improvers, and thickening agents.

When these additional additives are contained, the added amount (total amount) is typically from 0.1 to 10 mass % relative to the total amount of the grease composition.

Examples of the antioxidants above include: hindered phenol-based antioxidants, such as octadecyl-3-(3,5-di-t-butyl-4-hydroxyphenyl)propionate, pentaerythritol tetrakis [3-(3,5-di-t-butyl-4-hydroxyphenyl)propionate], 2,4-bis-(n-octylthio)-6-(4-hydroxy-3,5-di-t-butylanilino)-1,3,5-triazine, 1,3,5-trimethyl-2,4,6-tris(3,5-di-t-butyl-4-hydroxybenzyl)benzene, triethylene glycol-bis[3-(3-t-butyl-5-methyl-4-hydroxyphenyl)propionate], 1,6-hexanediol-bis [3-(3,5-di-t-butyl-4-hydroxyphenyl)propionate], 2,2-thio-diethylenebis[3-(3,5-di-t-butyl-4-hydroxyphenyl) propionate], N,N'-hexamethylenebis(3,5-di-t-butyl-4-hydroxy-hydrocinnamide), and octyl-3,5-di-tert-butyl-4-hydroxy-hydrocinnamic acid;

other phenol-based antioxidants, such as 2,6-di-t-butyl-4-methylphenol and 4,4-methylenebis(2,6-di-t-butylphenol); and amine-based antioxidants, such as diphenylamine, alkylated diphenylamine, triphenylamine, hindered amine, phenyl-α-naphthylamine, alkylated phenyl-α-naphthylamine, phenothiazine, and alkylated phenothiazine.

Among the antioxidants, phenol-based antioxidants, particularly hindered phenol-based antioxidants selected from the group consisting of octadecyl-3-(3,5-di-t-butyl-4-hydroxyphenyl)propionate, 2,4-bis-(n-octylthio)-6-(4-hydroxy-3,5-di-t-butylanilino)-1,3,5-triazine, triethyleneglycol-bis[3-(3-t-butyl-5-methyl-4-hydroxyphenyl) propionate], 2,2-thio-diethylenebis[3-(3,5-di-t-butyl-4-hydroxyphenyl)propionate] and octyl-3,5-di-tert-butyl-4-hydroxy-hydrocinnamic acid, and amine-based antioxidants of diarylamine compounds such as diphenylamine, alkylated diphenylamine, phenyl-α-naphthylamine and alkylated phenyl-α-naphthylamine are suitable from the viewpoint of disk adhesion. Further, the above-described hindered phenol-based antioxidants are more suitable from the viewpoint of sludge suppression.

Examples of the extreme pressure additive include phosphorus-based compounds, chlorine-based compounds, and polymeric esters.

Among them, phosphate ester-based compounds such as phosphate esters, phosphite esters and phosphate ester amine salts, that is, phosphorus-based compounds can be suitably used.

Examples of suitable phosphate ester-based compounds include phosphate triesters such as tricresyl phosphate (CAS No. 1330-78-5), triphenyl phosphate, tributyl phosphate, trioctyl phosphate and trioleyl phosphate; phosphite diesters and/or phosphite triesters such as dilauryl hydrogen phosphite (CAS No. 21302-09-0), tricresyl phosphite (CAS No. 25586-42-9), tris(2-ethylhexyl) phosphite (CAS No. 301-13-3), triisodecyl phosphite (CAS No. 25448-25-3), trilauryl phosphite (CAS No. 3076-63-9), tris(triisodecyl) phosphite (CAS No. 77745-66-5) and trioleyl phosphite (CAS No. 13023-13-7); phosphate monoesters and/or phosphate diesters (acidic phosphate esters) such as 2-ethylhexyl acid phosphate (CAS No. 12645-31-7), alkyl (C12, C14, C16, C18) acid phosphate, isotridecyl acid phosphate (CAS No. 52933-07-0) and oleyl acid phosphate (CAS No. 37310-83-1), and these are also commercially available.

Among them, the phosphate triester, phosphate monoester and/or phosphate diester are/is preferable from the viewpoint of sludge suppression, and, among them, the phosphate triester is preferred. Specific examples can include at least one selected from the group consisting of tricresyl phosphate (CAS No. 1330-78-5), triphenyl phosphate, tributyl phosphate, trioctyl phosphate, trioleyl phosphate, 2-ethylhexyl acid phosphate (CAS No. 12645-31-7), alkyl (C12, C14, C16, C18) acid phosphate, isotridecyl acid phosphate (CAS No. 52933-07-0), and oleyl acid phosphate (CAS No. 37310-83-1). In particular, from the viewpoint of corrosion inhibition, one selected from the group consisting of tricresyl phosphate (CAS No. 1330-78-5), triphenyl phosphate, tributyl phosphate, trioctyl phosphate, and trioleyl phosphate is suitable, and tricresyl phosphate is particularly suitable.

Sulfur-containing additives having been used as the extreme pressure additives, for example, metal salts of sulfur-based compounds (calcium sulfonates and the like) and thiophosphate triesters such as triphenoxyphosphine sulfide (TPPS) which can also be classified as phosphorus-based compounds, are desirably avoided from the viewpoint of sludge suppression.

Examples of the metal deactivator include benzotriazole and sodium nitrite.

Furthermore, for the wear resistant agents, tricresyl phosphate and polymeric esters are included.

In addition, examples of the polymeric esters include, for example, esters of aliphatic monobasic carboxylic acids and dibasic carboxylic acids with a polyhydric alcohol. Specific examples of the polymeric esters include, but are not limited to, PRIOLUBE (trade name) product line available from Croda Japan K.K.

The grease composition to be used in the present invention can be obtained by blending the aromatic ester-based base oil and the thickener, and an additional additive, as necessary.

In addition, for example, a grease composition can be obtained by blending an additional additive, as necessary, into a urea-based grease (base grease) composed of the aromatic ester-based base oil and the urea-based thickener.

Usually, a content of the thickener relative to the base grease is about from 10 to 30 mass %. For example, a content of the diurea compound (urea-based thickener) relative to the urea-based grease can be, for example, about from 10 to 25 mass %, or about from 10 to 20 mass %.

<Storage Elastic Modulus>

The grease composition to be used in the present invention suitably has a storage elastic modulus in an appropriate range. That is, the storage elastic modulus at 25° C. as measured under conditions of a film thickness of 1 mm and a shear strain of 1% is suitably from 1200 to 3000 Pa.

The storage elastic modulus is a value indicating the shape stability of the grease and is an effective parameter for grasping the shape stability of the grease immediately after the grease is filled in the bearing apparatus or during oscillation of the bearing apparatus.

For example, in a pivot assembly bearing apparatus, grease is filled only on a grease pocket of a crown-shaped retainer. Therefore, if the shape of the grease changes from the shape at the time of filling, the grease may be entangled with balls (rolling elements) or the like, not only leading to an increase in torque or torque instability of the rolling bearing but also causing dust generation. Therefore, in order to achieve initial and long-term torque stability and suppress dust generation, the shape maintaining ability (shape stability) of the grease is an important factor.

The grease composition to be used in the present invention suitably has a storage elastic modulus at 25° C. of 1,200 Pa or more under the above measurement conditions (film thickness: 1 mm and shear strain: 1%), from the viewpoint of such shape stability of the grease. However, if the storage elastic modulus is too high, the grease composition may fall from the grease pocket of the crown-shaped retainer while maintaining the shape. In this case, since the grease is positioned on a revolving track of the rolling element, the resistance when the ball may pass over the grease increases, resulting in a concern about an increase in torque. Therefore, the storage elastic modulus desirably does not exceed 3000 Pa.

<Regarding Oil Separation Amount>

The grease composition to be used in the present invention suitably has an oil separation amount in an appropriate range, that is, an oil separation amount at 80° C. of from 200 to 270 $mm^2$/mg.

An oil separation amount measurement test is a known method for evaluating the amount of oil contents (base oil and additives) exuded from grease. Since the life of the grease changes depending on the magnitude of the oil separation amount, the grasp of the oil separation amount is important not only for grasping the life characteristics of the grease but also for obtaining appropriate lubricating performance. For example, in a pivot assembly bearing apparatus in which grease is applied to a grease pocket between ball pockets of a crown-shaped retainer, if the amount of oil separation is too small, it may cause a shortage of lubricating components (base oil and additives) supplied to balls (rolling elements) over time, leading to torque instability and seizure. On the other hand, too large an oil separation amount causes an issue that contamination due to oil leakage is likely to occur.

The grease blended with the urea-based thickener to be used in the present invention generally has a small oil separation amount. Therefore, when the oil separation amount is measured using a known standard oil separation measurement method such as JIS K2220 defining a method for measuring an oil separation degree, a clear difference in measurement result may be hardly generated.

Therefore, in the present invention, a unique method that makes the difference in the amount of oil separation more clear is adopted. To be more specific, 9 mg of a grease composition was allowed to stand still in a φ3 mm columnar shape on a drug-placing surface of a charta, and an area of an oil bleeding (bleeding of the base oil) portion formed in the charta was measured at the time when this was left in an environment at 80° C. for 24 hours. Then, the area of the oil bleeding portion per mass of the grease was defined as the oil separation amount ($mm^2$/mg). In this test, the charta used was "pure white simili (medium)" (size: 105 mm×105 mm, thickness: 42 μm, basis weight: 30 g/$m^2$) available from Hakuaisha Co., Ltd., and the grease composition was allowed to stand still on the drug-placing surface (glossy surface) as described above.

When the known grease with no poor lubrication was evaluated by this unique method based on the above definition, it was confirmed that the oil separation amount of the known grease was approximately from 230 to 280 $mm^2$/mg. In the known grease having an oil separation amount of 200 $mm^2$/mg or less, seizure due to poor lubrication was confirmed. The upper limit value of the oil separation amount is about 300 $mm^2$/mg in consideration of the fact that too large an oil separation amount causes oil leakage.

Based on the above results, for the grease composition used in the present invention, 9 mg of the grease composition is allowed to stand still in a φ3 mm columnar shape on a charta, and an area of an oil bleeding portion formed in the charta is measured at the time when this is left in an environment at 80° C. for 24 hours. The grease composition is evaluated to be suitable with an oil separation amount of from 200 $mm^2$/mg to 270 $mm^2$/mg.

As described above, the storage elastic modulus of the grease composition used in the present embodiment is set to a predetermined range, and thus the shape of the grease composition filled in the ball pocket (grease pocket) of the retainer is unlikely to collapse. Also, the grease composition has an appropriate oil separation amount, and thus the grease composition itself does not fall from the ball pocket (grease pocket) onto a track surface of the rolling bearing, and dust generation causing generation of particles can be expected to be suppressed.

In addition, the use of an aromatic ester compound having an alkyl group having a predetermined number of carbon atoms or more as the base oil makes it possible to suppress adhesion of a generated dust component or a volatile component to a magnetic disk or the like even when the dust is generated or the base oil is volatilized due to driving in a high temperature environment.

The above-described configuration can suppress disk read/write errors of the disk drive apparatus caused by dust generation and volatile components.

The disclosure is not limited to the embodiment and specific examples described in the present specification, and various changes and variations can be made within the scope of the technical idea described in the claims.

EXAMPLES

The disclosure is described below in more detail with reference to examples. However, the disclosure is not limited to the examples.

The grease compositions used in Examples 1 to 5 and Comparative Examples 1 to 5 were prepared with the blending amounts presented in each table below. The "hardening treatment" in Tables 1 and 2 refers to a treatment of allowing the prepared grease composition to stand still at 75° C. and 40% RH for 5 hours. This treatment is performed in consideration of the possibility that the same properties may be obtained as the properties after the hardening treatment depending on the blending conditions of the grease and the case where a harder grease is required.

The details and abbreviation of each component used in the preparation of the grease compositions of the Examples and the Comparative Examples are as follows:

<Thickener>
  Alicyclic aliphatic diurea compound: The molar ratio of the alicyclic hydrocarbon group to the aliphatic hydrocarbon group is from 5:5 to 8:2 (see Tables 1 and 2)

<Base Oil>
  Aromatic ester (trimellitate ester):
  Nine (9) carbon atoms: An alkyl ester of trimellitic acid with 9 carbon atoms (a compound represented by the following formula [A] where R is K1)
  Eleven (11) carbon atoms: An alkyl ester of trimellitic acid with 11 carbon atoms (a compound represented by the following formula [A] where R is K2)
  Eight (8) carbon atoms: An alkyl ester of trimellitic acid with 8 carbon atoms (a compound represented by the following formula [A] where R is K3)
  Mineral oil+PAO: Mixed oil of mineral oil and polyalphaolefin oil

[Chem. 2]

[A]   * Bonding site to oxygen atom

<Additive>
Antioxidant:
Phenol-based: Hindered phenol-based antioxidant (2,2-thio-diethylenebis[3-(3,5-di-t-butyl-4-hydroxyphenyl)propionate], product name "Irganox L115", BASF Japan Ltd.)
Amine-based: Hindered amine-based antioxidant (bis(1,2,2,6,6-pentamethyl-4-piperidyl) sebacate, product name "Adekastab LA-72", ADEKA Corporation)
Extreme pressure additive:
Phosphate ester-based extreme pressure additive, FUJIFILM Wako Pure Chemical Corporation, product name "Tritolyl Phosphate"

The storage elastic modulus, the oil separation amount, the number of particles (amount of generated dust), and the disk adhesion of the base oil, for each of the obtained grease compositions, were evaluated by the following procedures. In addition, the worked penetration of each grease composition was measured. The results obtained are presented in Tables 1 and 2.

<(1) Measurement and Evaluation of Storage Elastic Modulus (Unit: Pa)>

A storage elastic modulus G' of each grease composition was measured using a rotational viscosimeter available from Anton Paar GmbH. Measurement was performed in a measurement mode of a strain dispersion method (strain was variable from 100% to 0.01%) using, as a jig, a φ25 mm parallel plate (PP25) at a plate gap of 1 mm and a temperature of 25° C. The measured value when the strain was 1% was defined as the storage elastic modulus G' (Pa), and the storage elastic modulus (average value when N=3) was evaluated according to the following criteria for determination.

<Criteria for Determination>
N: Storage elastic modulus of less than 1200 Pa
A: Storage elastic modulus of 1200 Pa or more and 3000 Pa or less
N: Storage elastic modulus of more than 3000 Pa <(2) Measurement and Evaluation of Oil Separation Amount (Unit: $mm^2/mg$)>

Each of the prepared grease compositions (9 mg) was allowed to stand still on the drug-placing surface in a φ3 mm columnar shape and left in an environment at 80° C. for 24 hours. After a lapse of 24 hours, the area of the oil bleeding portion formed in the charta was measured. The area of the oil bleeding portion per mass of the grease composition was calculated as the oil separation amount ($mm^2/mg$), and the oil separation amount (average value when N=3) was evaluated according to the following criteria for determination.

In this test, the charta used was "pure white simili (medium)" (size: 105 mm×105 mm, thickness: 42 μm, basis weight: 30 $g/m^2$) available from Hakuaisha Co., Ltd., and the grease composition was allowed to stand still on the drug-placing surface (glossy surface) as described above.

<Criteria for Determination>
N: Oil separation amount of less than 200 $mm^2/mg$
A: Oil separation amount of 200 $mm^2/mg$ or more and 270 $mm^2/mg$ or less
N: Oil separation amount of more than 270 $mm^2/mg$ <(3) Measurement of Number of Particles (Amount of Generated Dust)>

An oscillation tester was installed in a closed space configured so that dust and the like were not mixed from the outside, and a pivot assembly bearing apparatus including a ball bearing filled with each grease composition was installed in the oscillation tester, and was oscillated at an oscillation angle of 20 degrees, an oscillation frequency of 20 Hz, and a temperature of from 20 to 30° C. for 7 hours.

The number of particles in the closed space during oscillation was measured using an aerial particle counter (KC22-A available from RION Co., Ltd.), and the total volume [$\mu m^3$] of particles was calculated from the number of particles for each particle diameter, and this was evaluated as the number of particles in each example (amount of generated dust: mean value when N=3).

<(4) Disk Adhesion (1)>

For each of the base oils used in Example 1, Example 2 (Examples 2 to 7), Comparative Example 1 (Comparative Examples 1 to 5), Comparative Example 6, and Comparative Examples 1 to 7, the disk adhesion was evaluated by the following procedure.

An aluminum magnetic disk plated with electroless nickel was washed twice with each of n-hexane and isopropyl alcohol having a purity of 99% or more, and then completely dried. To this disk, 5 μL of a base oil (sample oil) diluted to 10 vol % with hexane was dropped, and the disk was allowed to stand still for 1 hour as it was.

The state of the droplet after dropping was captured by a camera fixed above the disk. The total areas of the droplet immediately after dropping (after about 5 seconds) and after standing still for 1 hour after dropping were calculated by image analysis software. The percentage (%) (disk adhesion) of the area value after standing still for 1 hour after dropping to the area value immediately after dropping [area value 1 hour after dropping (final area)/area value immediately after dropping (initial area)] was determined (when the area values before and after standing still do not change at all, the disk adhesion is 100%).

This test was repeated a plurality of times for one sample at a temperature of from 20 to 30° C. and a humidity of 30 to 70% RH, and an average value of values when reproducibility (result of area value: within ±5%, N=4 or more) was obtained was adopted as a test result.

Based on the obtained results, evaluation was performed according to the following criteria for determination.

<Criteria for Determination of Disk Adhesion>
  A: Disk adhesion of less than 30%
  N: Disk adhesion of 30% or more

TABLE 1

|  |  |  |  | Examples |  |  |  |  |
|---|---|---|---|---|---|---|---|---|
|  |  |  |  | 1 | 2 | 3 | 4 | 5 |
| Thickener*1 | Diurea compound | Alicyclic:Aliphatic (Molar ratio) = 8:2 |  |  |  |  | ○ | ○ |
|  |  | Same as above | 7:3 |  |  | ○ |  |  |
|  |  | Same as above | 6:4 | ○ | ○ |  |  |  |
|  |  | Same as above | 5:5 |  |  |  |  |  |
| Base oil*1 | Aromatic ester (trimellitate ester) | Number of carbons: 9 | (52 mm²/s)*2 | ○ |  |  |  |  |
|  |  | Number of carbons: 11 | (71 mm²/s)*2 |  | ○ | ○ | ○ | ○ |
|  |  | Number of carbons: 8 | (91 mm²/s)*2 |  |  |  |  |  |
|  | Mineral oil + PAO |  | (74 mm²/s)*2 |  |  |  |  |  |
| Additive | Antioxidant | Phenol-based | [Blending amount]*1 | 1 | 1 | 1 | 1 | 1 |
|  |  | Amine-based | [Blending amount]*1 |  |  |  |  |  |
|  | Extreme pressure additive | Phosphate ester-based | [Blending amount]*1 | 2 | 1 | 2 | 2 | 3 |
|  |  | Worked penetration |  | 295 | 295 | 280 | 277 | 263 |
| Storage elastic modulus |  | Measured value [Pa] |  | 1405 | 1315 | 1543 | 1419 | 2862 |
|  |  | Evaluation*3 |  | A | A | A | A | A |
| Oil separation amount |  | Measured value [mm²/mg] |  | 222 | 268 | 211 | 220 | 203 |
|  |  | Evaluation*4 |  | A | A | A | A | A |
| Number of particles |  | Measured value [μm³] |  | 0.9 | 0.7 | 0.5 | 0.6 | 0.2 |
|  |  | Determination of disk adhesion*5 |  | A | A | A | A | A |
|  |  | Hardening treatment Yes/No |  | No | No | No | No | Yes |

Notes:
*1Blending amount:
Thickener: From 10 to 13 mass % relative to the total mass of the grease composition (thickener, base oil, and additives (antioxidant, extreme pressure additive))
Base oil: Blending amount is adjusted so that the total mass of the grease composition is 100 mass % in total.
Additives (antioxidant, extreme pressure additive): Proportion relative to the total mass of the grease composition (unit: mass %)
*2Numerical values in parentheses indicate kinematic viscosities at 40° C.
*3A (Suitable): Storage elastic modulus of 1200 Pa or more and 3000 Pa or less
N (Unsuitable): Storage elastic modulus of less than 1200 Pa or more than 3000 Pa
*4A (Suitable): Oil separation amount of 200 mm²/mg or more and 270 mm²/mg or less
N (Unsuitable): Oil separation amount of less than 200 mm²/mg or more than 270 mm²/mg
*5A (Suitable): Disk adhesion of less than 30%
N (Unsuitable): Disk adhesion of 30% or more

TABLE 2

|  |  |  |  | Comparative Example |  |  |  |  |
|---|---|---|---|---|---|---|---|---|
|  |  |  |  | 1 | 2 | 3 | 4 | 5 |
| Thickener*1 | Diurea compound | Alicyclic:Aliphatic (Molar ratio) = 8:2 |  |  |  |  | ○ | ○ |
|  |  | Same as above | 7:3 |  |  |  |  |  |
|  |  | Same as above | 6:4 |  |  |  |  |  |
|  |  | Same as above | 5:5 | ○ | ○ | ○ |  |  |
| Base oil*1 | Aromatic ester (trimellitate ester) | Number of carbons: 9 | (52 mm²/s)*2 |  |  |  |  |  |
|  |  | Number of carbons: 11 | (71 mm²/s)*2 | ○ | ○ | ○ |  |  |
|  |  | Number of carbons: 8 | (91 mm²/s)*2 |  |  |  |  | ○ |
|  | Mineral oil + PAO |  | (74 mm²/s)*2 |  |  |  | ○ |  |
| Additive | Antioxidant | Phenol-based | [Blending amount]*1 | 1 | 1 | 1 |  | 1 |
|  |  | Amine-based | [Blending amount]*1 |  |  |  | 1 |  |
|  | Extreme pressure additive | Phosphate ester-based | [Blending amount]*1 | 2 | 3 | 3 | 2 | 3 |
|  |  | Worked penetration |  | 282 | 288 | 255 | 245 | 250 |
| Storage elastic modulus |  | Measured value [Pa] |  | 830 | 1091 | 3382 | 1183 | 2263 |
|  |  | Evaluation*3 |  | N | N | N | N | A |
| Oil separation amount |  | Measured value [mm²/mg] |  | 237 | 218 | 195 | 253 | 182 |
|  |  | Evaluation*4 |  | A | A | N | A | N |
| Number of particles |  | Measured value [μm³] |  | 3.5 | 3.1 | 2.6 | 3.8 | 2.8 |

TABLE 2-continued

|  | Comparative Example | | | | |
|---|---|---|---|---|---|
|  | 1 | 2 | 3 | 4 | 5 |
| Determination of disk adhesion*5 | A | A | A | N | N |
| Hardening treatment Yes/No | No | No | Yes | No | No |

Notes:
*1Blending amount:
Thickener: From 10 to 15 mass % relative to the total mass of the grease composition (thickener, base oil, and additives (antioxidant, extreme pressure additive))
Base oil: Blending amount is adjusted so that the total mass of the grease composition is 100 mass % in total.
Additives (antioxidant, extreme pressure additive): Proportion relative to the total mass of the grease composition (unit: mass %)
*2Numerical values in parentheses indicate kinematic viscosities at 40° C.
*3A (Suitable): Storage elastic modulus of 1200 Pa or more and 3000 Pa or less
N (Unsuitable): Storage elastic modulus of less than 1200 Pa or more than 3000 Pa
*4A (Suitable): Oil separation amount of 200 mm²/mg or more and 270 mm²/mg or less
N (Unsuitable): Oil separation amount of less than 200 mm²/mg or more than 270 mm²/mg
*5A (Suitable): Disk adhesion of less than 30%
N (Unsuitable): Disk adhesion of 30% or more As presented in Table 1, the grease compositions of Examples 1 to 5 had a storage elastic modulus (1200 Pa or more and 3000 Pa or less) and an oil separation amount (200 mm²/mg or more and 270 mm²/mg or less) in suitable (A) ranges, and had a value of the number of particles smaller than the values of Comparative Examples as described below and suppressed dust generation. Further, the base oils used in the grease compositions of these Examples were determined as A in terms of disk adhesion (hardly adhered to the disk).

On the other hand, all of the grease compositions of Comparative Examples 1 to 5, were determined to be unsuitable (N) in terms of storage elastic modulus, and the grease compositions of Comparative Examples 3 and 5 were determined to be unsuitable (N) also in terms of oil separation amount. As a result, the grease compositions had a value of the number of particles larger than the values of the examples. The base oils used in the grease compositions of Comparative Examples 4 and 5 were determined as N in terms of disk adhesion.

<(5) Disk Adhesion (2)>

The antioxidants presented in Table 3, which were used in the grease compositions, were evaluated for disk adhesion by the same procedure and test procedure as in the <(4) Disk Adhesion (1)> section above.

The abbreviations in Table 3 are as follows.
<Hindered Phenol-Based Antioxidant>
Irganox L115: 2,2-Thio-diethylenebis[3-(3,5-di-t-butyl-4-hydroxyphenyl)propionate], BASF Japan Ltd.
Irganox L135: Octyl-3,5-di-tert-butyl-4-hydroxy-hydrocinnamic acid
Irganox 1076FD: Octadecyl-3-(3,5-di-t-butyl-4-hydroxyphenyl)propionate, BASF Japan Ltd.
Irganox 245: Triethyleneglycol-bis[3-(3-t-butyl-5-methyl-4-hydroxyphenyl)propionate], BASF Japan Ltd.
Irganox 565: 2,4-Bis-(n-octylthio)-6-(4-hydroxy-3,5-di-t-butylanilino)-1,3,5-triazine, BASF Japan Ltd.
<Amine-Based Antioxidant>
<Diarylamine-Based Antioxidant>
Irganox L57: Diphenylamine represented by the following formula [B]
Irganox L67: Diphenylamine represented by the following formula [B]

[Chem. 3]

where R' and R" each independently represent an octyl group, a hydrogen atom, or a tert-butyl group.
Irganox L06: Octylated phenyl-α-naphthylamine, BASF Japan Ltd.
<Hindered Amine-Based Antioxidant>
Adekastab LA-72: Bis(1,2,2,6,6-pentamethyl-4-piperidyl) sebacate, ADEKA Corporation
Irgalube Base 10: Dodecanoic acid (2,2,6,6-tetramethyl-4-piperidyl), BASF Japan Ltd.

An aluminum magnetic disk plated with electroless nickel was washed twice with each of n-hexane and isopropyl alcohol having a purity of 99% or more, and then completely dried.

Each of the antioxidants presented in Table 3 was diluted to 10 vol % with an alkyl ester of trimellitic acid with 11 carbon atoms (a compound represented by the above formula [A] where R is K2), and further diluted to 10 vol % with hexane to prepare an antioxidant sample.

Then, 5 µL of the antioxidant sample was dropped to the washed and dried disk, and the disk was allowed to stand for 1 hour as it was.

The state of the droplet after dropping was observed in the same manner as in (4) Disk Adhesion above, and the disk adhesion [%] was determined from the area values of the droplet before and after standing still for 1 hour after dropping.

Based on the obtained results, evaluation was performed according to the following criteria for determination.
<Criteria for Determination of Disk Adhesion>
A: Disk adhesion of less than 30%
N: Disk adhesion of 30% or more

TABLE 3

| Antioxidant Type | Antioxidant Name | Determination of disk adhesion |
|---|---|---|
| Hindered phenol-based | Irganox L115 | A |
|  | Irganox L135 | A |
|  | Irganox 1076FD | A |
|  | Irganox 245 | A |

TABLE 3-continued

| Antioxidant Type | Antioxidant Name | Determination of disk adhesion |
|---|---|---|
|  | Irganox 565 | A |
| Diarylamine-based | Irganox L57 | A |
|  | Irganox L67 | A |
|  | Irganox L06 | A |
| Hindered amine-based | Adekastab LA-72 | N |
|  | Irgalube Base 10 | N |

As presented in Table 3, it was confirmed that the hindered phenol-based antioxidants and the diarylamine-based antioxidants are antioxidants hardly adhering to the disk.

On the other hand, the hindered amine-based antioxidants were evaluated as easily adhering to the disk, and it was confirmed that the antioxidants are not suitable for addition to the grease compositions according to the issue of the present invention.

<(6) Evaluation of Sludge Generation>

The extreme pressure additives presented in Table 4 used in the grease compositions were evaluated for sludge generation.

Each of the extreme pressure additives presented in Table 4 was diluted to from 1 to 2 vol % with an alkyl ester of trimellitic acid with 11 carbon atoms (a compound represented by the above formula [A] where R is K2).

For each extreme pressure additive sample, a shell type high-speed quaternary tester was operated in accordance with ASTM D 4172 at a rotational speed of 1200 rpm, a load of 392 N, a temperature of 75° C., and a time of 5 minutes.

Images of balls after the high-speed four ball test were captured with an optical microscope (magnification: 200×).

Figure 5:
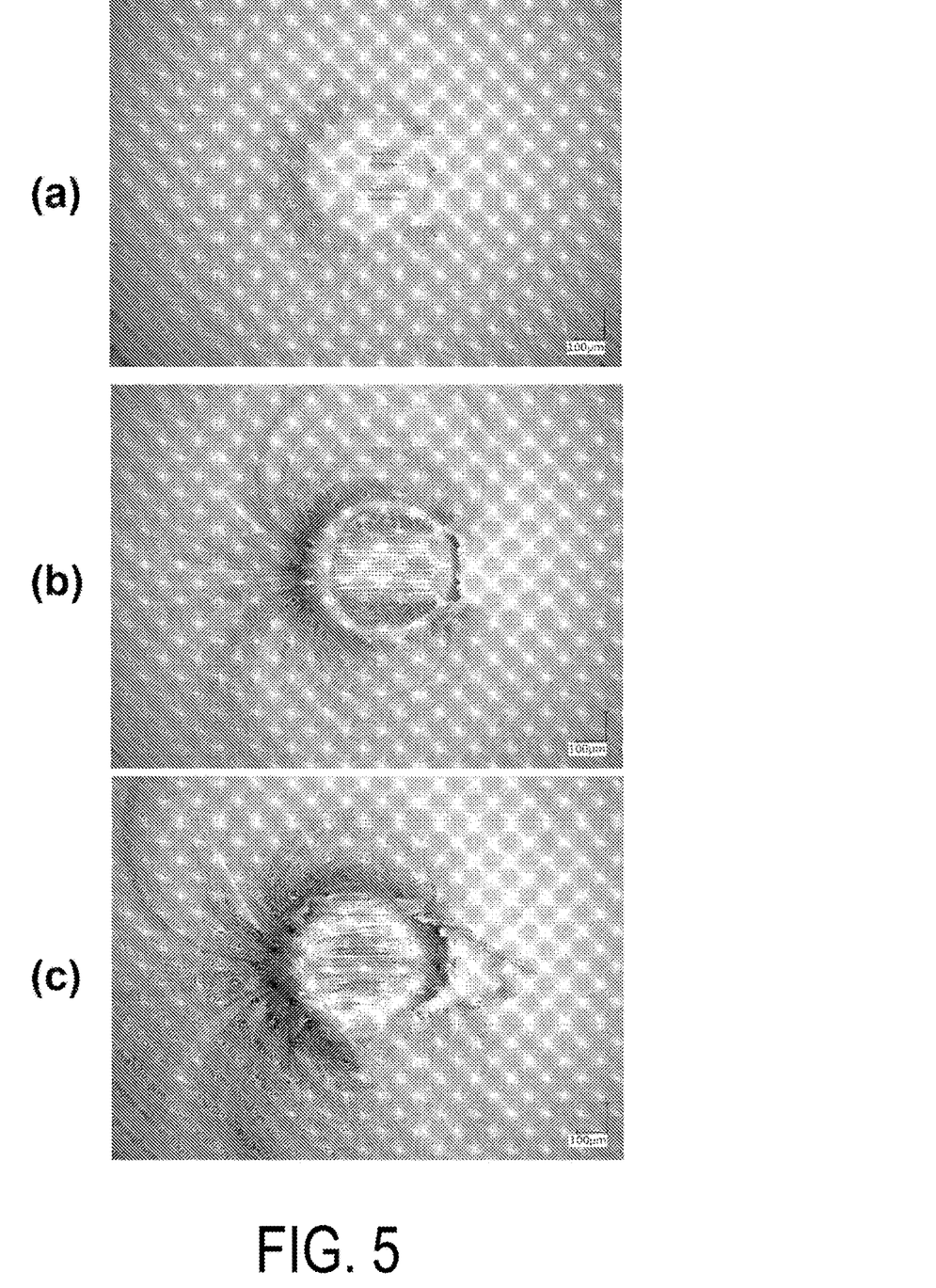
FIG. 5 illustrates photographed images of balls after a high-speed quaternary test in evaluation of sludge generation.

As reference images, captured images of balls evaluated as E, A, and N according to criteria for determination as will be described below are illustrated in FIG. 5 [FIG. 5(a): evaluated as E, FIG. 5(b): evaluated as A, and FIG. 5(c): evaluated as N].

(Image analysis as described below was performed based on the captured images illustrated in FIG. 5). Hereinafter, image analysis software ImageJ 1.53f was used for analysis of the captured images.

The captured images were converted into 16-bit gray scale images (65536 gradations), and then converted into monochrome two gradation images with a region having a color tone of from 0 to 100 as a black part. This black part corresponds to a sludge generation part. With respect to the images after the conversion, both left and right ends with an unstable light amount were excluded by 15% with respect to the width of the images.

The monochrome two gradation images after both the left and right ends were excluded were used as target images for analysis, and the sum of the areas of the black parts of the target images for analysis was obtained by the analyze particles function of the image analysis software ImageJ 1.53f.

The ratio of the sum of the areas of the black parts to the area of the entire target image for analysis [sum of the areas of the black parts/area of the entire target image for analysis] (percentage (%)) was defined as an area rate, and evaluation was performed according to the following criteria for determination.

<Criteria for Determination>

E (Very good): Area rate of less than 0.1%
A (Good): Area rate of 0.1% or more and less than 10%
N (Not Good): Area rate of 10% or more

TABLE 4

|  | Extreme pressure additive Name | Determination of sludge |
|---|---|---|
| Phosphate triester | Tricresyl phosphate (CAS No. 1330-78-5) | E |
| Phosphate monoester and/or Phosphate diester | 2-Ethylhexyl acid phosphate (CAS No. 12645-31-7) | E |
|  | Alkyl (C12, C, 14, C16, C18) acid phosphate | E |
|  | Isotridecyl acid phosphate (CAS No. 52933-07-0) | E |
|  | Oleyl acid phosphate (CAS No. 37310-83-1) | E |
| Phosphite diester and/or Phosphite triester | Dilauryl hydrogen phosphite (CAS No. 21302-09-0) | A |
|  | Tricresyl phosphite (CAS No. 25586-42-9) | A |
|  | Tris(2-ethylhexyl) phosphite (CAS No. 301-13-3) | A |
|  | Triisodecyl phosphite (CAS No. 25448-25-3) | A |
|  | Trilauryl phosphite (CAS No. 3076-63-9) | A |
|  | Tris(triisodecyl) phosphite (CAS No. 77745-66-5) | A |
|  | Trioleyl phosphite (CAS No. 13023-13-7) | A |
| Thiophosphate triester | Irgalube TPPT triphenyl phosphorothioate | N |
|  | Irgalube211 trinonylphenyl phosphorothioate | N |
|  | Irgalube232 alkylated triphenyl phosphorothioate | N |

As presented in Table 4, the phosphate triester, the phosphate monoester and/or the phosphate diester were/was evaluated as E (Very good) for sludge determination; the phosphite diester and/or the phosphite triester were/was also evaluated as A (Good); and it was confirmed that the phosphate ester-based extreme pressure additives were suppressed in terms of sludge.

On the other hand, the sulfur-containing additive was evaluated as N (Unsuitable) in the sludge determination and was not determined to be suitable for grease compositions.

The best embodiments have been described in detail above, but the disclosure is not limited to the embodiments described above, and variations, modifications, and the like within a range achieving the object of the disclosure are included in the disclosure.

REFERENCE SIGNS LIST

10 . . . Rolling bearing; 11 . . . Inner ring; 12 . . . Outer ring; 13 . . . Rolling element; 14 . . . Retainer; 15 . . . Sealing member; 16 . . . Bearing space;
20 . . . Disk drive apparatus; 21 . . . Base (base plate); 22 . . . Spindle motor; 23 . . . Magnetic disk; 24 . . . Swing arm; 25 . . . Magnetic head; 26 . . . Actuator; 27 . . . Controller;
30 . . . Pivot assembly bearing apparatus; 31 . . . Shaft (axis); 31a . . . Shaft body; 31b . . . Flange portion; 32 . . . Sleeve (outer peripheral member); 32a . . . Spacer portion; 40 . . . First bearing; 41 . . . First inner ring (inner race); 42 . . . First outer ring (outer race); 43 . . . Ball (rolling element); 44 . . . Retainer; 45 . . . Sealing member; 50 . . . Second bearing; 51 . . . Second inner ring (inner race); 52 . . . Second outer ring (outer race); 53 . . . Ball (rolling element); 54 . . . Retainer; 55 . . . Sealing member;
60 . . . Crown-shaped retainer; 61 . . . Annular member; 6a . . . End surface; 62 . . . Ball pocket (recess); 63 (63a and 63b) . . . Claw; 64 . . . Grease pocket

The invention claimed is:

1. A rolling bearing, comprising:
an inner ring;
an outer ring disposed coaxially with the inner ring at an outer peripheral side of the inner ring;
a plurality of rolling elements disposed between the inner ring and the outer ring;
a retainer retaining the rolling elements; and
a grease composition retained between the inner ring and the outer ring, the grease composition comprising an aromatic ester-based base oil and a thickener,
the thickener comprising a urea-based thickener, the urea-based thickener comprising a diurea compound represented by Formula (1):

$$R_1\text{—NHCONH—}R_2\text{—HNOCHN—}R_3 \quad \text{Formula (1)}$$

where in Formula (1), $R_1$ and $R_3$ are monovalent alicyclic hydrocarbon groups or monovalent aliphatic hydrocarbon groups, and a molar ratio of the alicyclic hydrocarbon group to the aliphatic hydrocarbon group is from 6:4 to 8:2, and $R_2$ represents a divalent aromatic hydrocarbon group,
the aromatic ester-based base oil comprises an aromatic ester compound having an ester group *—C(=O)O— as a substituent on an aromatic ring, where * is a bonding site to the aromatic ring, and having an alkyl group with a total of 8 or more carbon atoms bonded to the oxygen atom of the ester group, and the alkyl group is selected from the group consisting of:
a branched alkyl group formed with a branched chain bonded to a linear alkyl group with 8 or more and 11 or less carbon atoms, and
a branched alkyl group formed with two or more branched chains bonded to a linear alkyl group with 6 or more and 11 or less carbon atoms,
wherein the grease composition has:
a storage elastic modulus at 25° C. of from 1200 to 3000 Pa as measured under conditions of a film thickness of 1 mm and a shear strain of 1%, and
an oil separation amount at 80° C. of from 200 to 270 mm²/mg.

2. The rolling bearing according to claim 1, wherein the aromatic ester-based base oil has a kinematic viscosity at 40° C. of from 40 to 150 mm²/s.

3. The rolling bearing according to claim 2, wherein the aromatic ester-based base oil has a kinematic viscosity at 40° C. of from 50 to 80 mm²/s.

4. The rolling bearing according to claim 1, wherein the grease composition further comprises a phenol-based antioxidant.

5. The rolling bearing according to claim 1, wherein the grease composition further comprises a diarylamine-based antioxidant.

6. The rolling bearing according to claim 1, wherein the grease composition further comprises a phosphate ester-based extreme pressure additive.

7. The rolling bearing according to claim 1, wherein the grease composition comprises the thickener in a proportion of from 10 mass % to 13 mass % based on a total mass of the grease composition.

8. The rolling bearing according to claim 1, wherein the grease composition has a worked penetration of from 260 to 300.

9. A pivot assembly bearing apparatus, comprising the rolling bearing according to claim 1.

10. A disk drive apparatus, comprising the pivot assembly bearing apparatus according to claim 9.

11. The disk drive apparatus according to claim 10, comprising 9 or more disks having a diameter of 3.5 inches.

12. The disk drive apparatus according to claim 10, wherein an internal space is filled with a gas having a density lower than air.

13. The disk drive apparatus according to claim 10, wherein the disk drive apparatus employs a heat-assisted magnetic recording system.

14. The rolling bearing according to claim 1, wherein the aromatic ester-based base oil is an aromatic ester compound selected from the group consisting of:
(A) an aromatic ester compound in which a branched alkyl group having a total of 11 carbon atoms is bonded to an oxygen atom of the ester group;
(B) an aromatic ester compound in which a branched alkyl group having a total number of carbon atoms of 11 and a linear alkyl group having a total number of carbon atoms of 11 are bonded to an oxygen atom of the ester group; and
(C) an aromatic ester compound in which a branched alkyl group having a total of 11 carbon atoms and a linear alkyl group having a total of 10 carbon atoms are bonded to an oxygen atom of the ester group.

15. The rolling bearing according to claim 14, wherein the aromatic ester-based base oil is the aromatic ester compound (B) or (C).

16. The rolling bearing according to claim 1, wherein the aromatic ester-based base oil is an aromatic ester compound selected from the group consisting of:

(a) an aromatic ester compound having a branched alkyl group having a total of 11 carbon atoms represented by the following formula (K)

[Chemical formula 1] wherein group R of the formula (K) is represented by the following formula:

x + y + z = 6

(K)

(b) a triester compound of trimellitic acid and a mixture of an alcohol in which a hydroxy group is bonded to a linear alkyl group having 11 carbon atoms and an alcohol in which a hydroxy group is bonded to a branched alkyl group having a total of 11 carbon atoms represented by the following group R

[Chemical formula 2]

and;

x + y + z = 6

(d) a triester compound of trimellitic acid and a mixture of an alcohol in which a hydroxy group is bonded to a linear alkyl group having 10 carbon atoms and an alcohol in which a hydroxy group is bonded to a branched alkyl group having a total of 11 carbon atoms represented by the group R.

17. The rolling bearing according to claim 16, wherein the aromatic ester-based base oil is the aromatic ester compound of (b) or (d).

* * * * *